United States Patent
Park et al.

(10) Patent No.: US 7,412,852 B2
(45) Date of Patent: Aug. 19, 2008

(54) WASHER DAMPER THEREOF, AND CONTROL METHOD THEREOF

(75) Inventors: Gwan Ryong Park, Seoul (KR); Si Moon Jeon, Seoul (KR); Seung Chul Park, Gwangmyeong-si (KR); Jae Hyun Kim, Sungnam-si (KR); Cha Seung Jun, Seoul (KR); Soo Young Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 429 days.

(21) Appl. No.: 11/062,821

(22) Filed: Feb. 23, 2005

(65) Prior Publication Data

US 2005/0188472 A1    Sep. 1, 2005

(30) Foreign Application Priority Data

Feb. 23, 2004    (KR) .................. 10-2004-0011826

(51) Int. Cl.
*D06F 37/22* (2006.01)
(52) U.S. Cl. .................. 68/12.06; 68/23.1; 68/24; 188/167; 188/271
(58) Field of Classification Search ........... 68/12.06, 68/24, 140; 188/267
See application file for complete search history.

(56) References Cited

U.S. PATENT DOCUMENTS

| | | | | |
|---|---|---|---|---|
| 2,416,337 | A | * | 2/1947 | Mason .................. 318/116 |
| 2,417,347 | A | * | 3/1947 | Brown .................. 188/268 |
| 5,327,603 | A | * | 7/1994 | Roh et al. .................. 8/159 |
| 5,572,922 | A | * | 11/1996 | Moon .................. 92/181 P |
| 6,983,832 | B2 | * | 1/2006 | Namuduri et al. ......... 188/267.2 |
| 7,225,905 | B2 | * | 6/2007 | Namuduri et al. ......... 188/267.1 |
| 7,253,763 | B2 | * | 8/2007 | Garlapati et al. ............ 341/155 |

FOREIGN PATENT DOCUMENTS

| | | | |
|---|---|---|---|
| DE | 1 9748571 | | 5/1999 |
| EP | 0555707 | | 1/1996 |
| EP | 1331299 | | 7/2003 |
| JP | 2-209643 | * | 8/1990 |
| JP | 4-4338 | * | 1/1992 |
| JP | 2003-144792 | | 5/2003 |

OTHER PUBLICATIONS

English language Abstract of JP 2003-144792.
English Language Abstract of DE 19748571.
English Language Abstract of EP 0555707.

* cited by examiner

*Primary Examiner*—Frankie L Stinson
(74) *Attorney, Agent, or Firm*—Greenblum & Bernstein, P.L.C.

(57) ABSTRACT

The present invention provides a washer, damper thereof, and control method thereof, by which noise is reduced by adjusting a damping force of the damper in a manner of turning on/off power of the damper according to an oscillation frequency of a vibrating body such as a washer. The control method reduces noise by supplying power to a damper in an excessive vibration state of a vibrating body such as a washer or by cutting off the power supplied to the damper in a normal vibration state of the vibrating body.

18 Claims, 7 Drawing Sheets

FIG. 11

WASHER DAMPER THEREOF, AND CONTROL METHOD THEREOF

This application claims the benefit of the Korean Application No. P2004-11826 filed on Feb. 23, 2004, which is hereby incorporated by reference.

BACKGROUND OF THE INVENTION

1. Field of the Invention

The present invention relates to a washer, damper thereof, and control method thereof.

2. Discussion of the Related Art

Generally, a washer is an apparatus for washing the laundry using a water current and chemical reaction of a detergent and the like. The washer performs washing, heated washing, rinsing, and dewatering cycles selectively or collectively according to a user's selection.

Washers are mainly categorized into a top-loading type washer and a front-loading type washer according to a laundry-loading system. A tub-rotating type washer and a pulsator type washer belong to the top-loading type washers. And, a drum type washer corresponds to the front-loading type washer.

A tub is provided within a cabinet of the washer to store water therein. A drum or inner tub is rotatably provided within the tub. And, a driving device is provided to the tub to generate a drive force for rotating the drum or inner tub. In this case, the driving device is connected to a washing shaft that is connected to the drum or inner tub.

When the drum or the like is rotated by the driving device, vibration appearing on the driving device, the drum, and the like is transferred to the tub. To absorb the vibration, the tub is supported by dampers and is suspended by suspension springs.

A deceleration device is provided to the washing shaft. Hence, in performing a washing cycle, the drum, which is decelerated by the deceleration device, rotates to wash the laundry. And, the drum rotates at high rotational speed to dewater the laundry in performing a dewatering cycle.

As the drum and the like is excessively shaken in the early stage of the dewatering cycle, excessive vibration is transferred to the tub, which is hereinafter named 'excessive vibration state'. Subsequently, as a rotational speed of the drum or the like is gradually raised, the vibration transferred to the tub is gradually reduced. Once the drum or the like reaches a normal rotational speed, the vibration transferred to the tub is more considerably reduced than that in the early stage of the dewatering cycle, which is hereinafter named 'normal vibration state'.

However, the related art washer has the following problems.

First of all, the damper, which provides the same damping force in the excessive or normal vibration state, amplifies the vibration of the drum and the like in the normal vibration state, thereby increasing the noise in performing the dewatering cycle of the washer.

Secondly, the normal vibration state is mostly maintained during the dewatering cycle. Hence, the noise is increased across the dewatering cycle overall.

Thirdly, a time taken to reach the normal vibration state inevitably varies according to an input quantity of the laundry in performing the dewatering cycle. If the normal vibration state is reached more quickly, the amplified noise is sustained for a considerably long time.

SUMMARY OF THE INVENTION

Accordingly, the present invention is directed to a washer, damper thereof, and control method thereof that substantially obviate one or more problems due to limitations and disadvantages of the related art.

An object of the present invention is to provide a washer, damper thereof, and control method thereof, by which washer noise is reduced by adjusting a damping force of the damper according to a displacement of vibration transferred to a tub of the washer.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a damper according to the present invention includes a cylinder, a piston coupled with the cylinder to enable a reciprocating motion, the piston generating a magnetic force with power impression, and a vibration-absorbing part provided within the cylinder, the vibration-absorbing part generating a frictional force by coming into contact with an inner circumference of the cylinder, the vibration-absorbing part attached to the piston by the magnetic force to absorb a vibration transferred to the cylinder or the piston.

In another aspect of the present invention, a damper includes a cylinder, a piston coupled with the cylinder to enable a reciprocating motion, and a vibration-absorbing part provided within the cylinder, the vibration-absorbing part generating a frictional force by coming into contact with an inner circumference of the cylinder, the vibration-absorbing part generating a magnetic force with power impression, the vibration-absorbing part attached to the piston by the magnetic force to absorb a vibration transferred to the cylinder or the piston.

In another aspect of the present invention, a method of controlling a damper includes the steps of driving a vibrating body, deciding an oscillation frequency of the vibrating body, and if the oscillation frequency is decided to exceed a predetermined value, absorbing a vibration transferred to a cylinder and a piston by attaching a piston and a vibration-absorbing part together by generating a magnetic force with power impression.

In another aspect of the present invention, a washer includes a tub, a drum rotatably provided within the tub, a cylinder supported by either a base or the tub, a piston supported by either the tub or the base, the piston coupled with the cylinder to enable a relative reciprocating motion, the piston generating a magnetic force with power impression, and a vibration-absorbing part provided within the cylinder, the vibration-absorbing part generating a frictional force by coming into contact with an inner circumference of the cylinder, the vibration-absorbing part attached to the piston by the magnetic force to absorb a vibration transferred to the cylinder or the piston.

In another aspect of the present invention, a washer includes a tub, a drum rotatably provided within the tub, a cylinder and a piston supported by a base and the tub, the cylinder and the piston assembled together to enable relative reciprocating motion, and a vibration-absorbing part provided within the cylinder, the vibration-absorbing part generating a magnetic force with power impression, the vibration-absorbing part attached to the piston by the magnetic force to absorb a vibration transferred to the cylinder or the piston.

In a further aspect of the present invention, a method of controlling a washer includes the steps of rotating a drum, deciding an oscillation frequency of a tub, and if the oscillation frequency is decided to exceed a predetermined value, absorbing a vibration transferred to the tub by attaching a piston and a vibration-absorbing part together by generating a magnetic force with power impression.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, a damper according to the present invention is applicable to a vibrating body, and more particularly, to a washer and the like of which number of vibrations or oscillation frequency varies. And, the damper according to the present invention is applicable to a top- or front-loading type washer as well. The damper applied to a drum type washer is explained as follows, for example.

A damper and a washer provided with the damper according to the present invention are explained with reference to FIG. 1 as follows.

Figure 1:
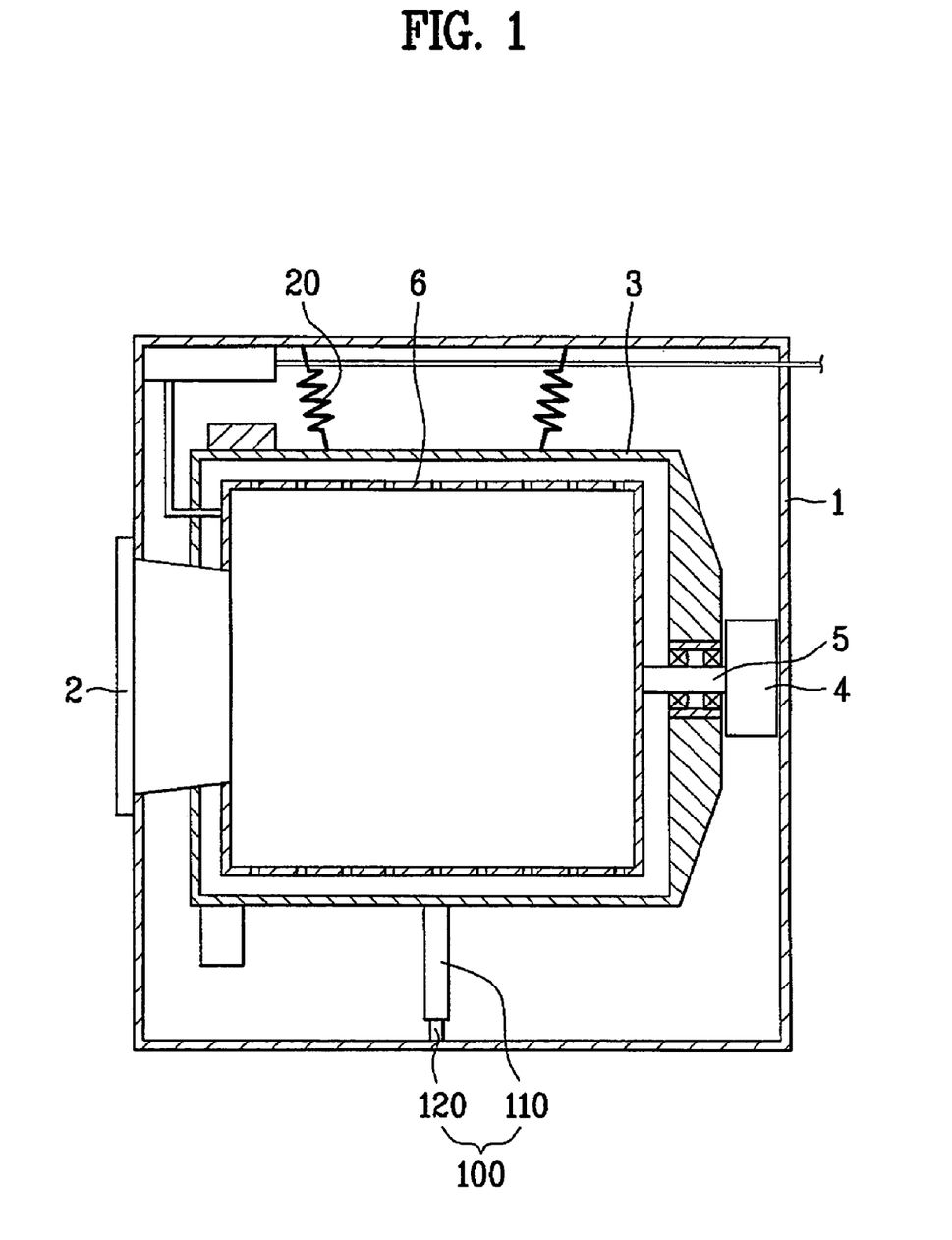
FIG. 1 is a cross-sectional diagram of a washer according to the present invention.

FIG. 1 is a cross-sectional diagram of a washer according to the present invention.

Referring to FIG. 1, in a drum type washer according to the present invention, a laundry entrance is provided to a cabinet 1 forming an exterior of the washer. And, a door 2 is provided to the laundry entrance to open/close. A tub 3 is provided within the cabinet 1 to store water therein. A driving device 4 is provided to the tub 3 to generate a driving force. A drum 6 is rotatably provided within the tub 3. And, the driving device 4 is connected to a washing shaft 5 that is connected to the drum 6.

The driving device can adopt a direct driving system for transferring a driving force generated from a motor to the washing shaft directly or an indirect driving system for transferring the driving force generated from the motor to the washing shaft via a power transmission means such as a belt and the like. And, the motor can adopt an inner rotor type motor having a rotor loaded in a central portion and an outer rotor type motor having the rotor loaded outside.

The tub 3 is suspended by at least one suspension spring 20 and is supported by a damper 100. specifically, a topside of the tub 3 is suspended by the suspension spring 20 and a bottom side of the tub 3 is supported by the damper 100. Although one damper 100 is shown in FIG. 1, a pair of dampers 10 are substantially provided to support both sides of the tub 3. It is a matter of course that at least one or more dampers can be provided to support the tub 3.

The damper 100 includes a cylinder 110 and a piston 120. One end of the cylinder 110 is connected to the tub 3 and one end of the piston 120 is coupled with a base, and vice versa.

A damper according to a first embodiment of the present invention is explained with reference to FIG. 2 and FIG. 3 as follows.

Figure 2:
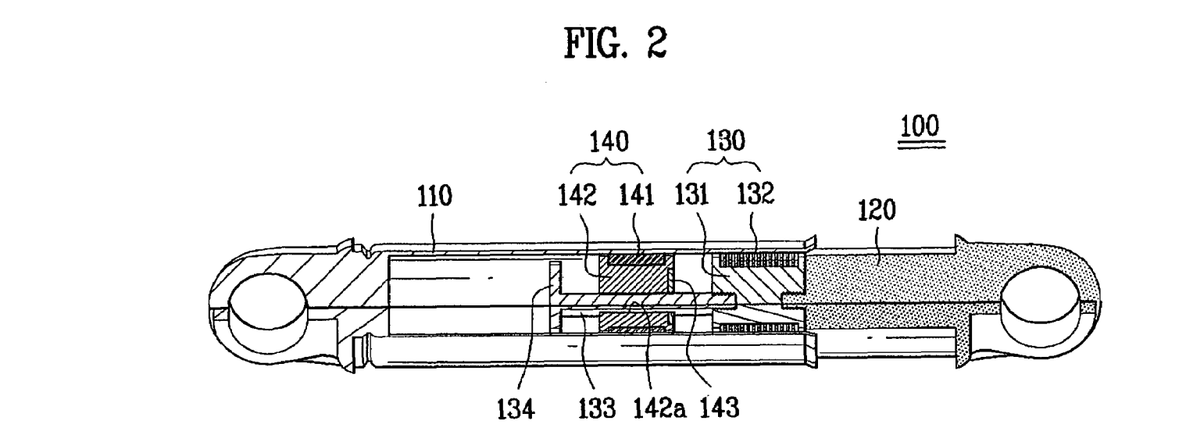
FIG. 2 is a perspective cross-sectional diagram of a damper according to a first embodiment of the present invention.
Figure 3:
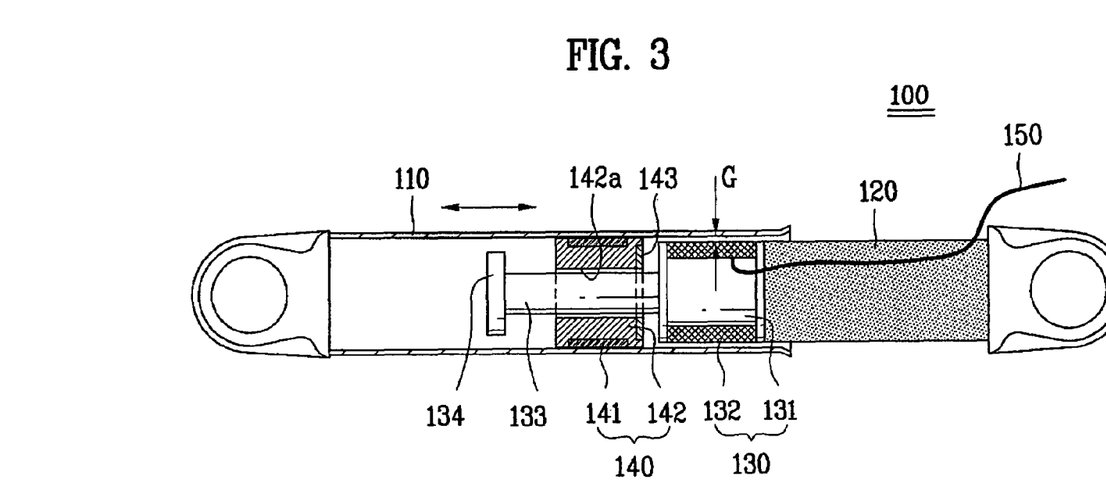
FIG. 3 is a cross-sectional diagram of the damper in FIG. 2.

Referring to FIG. 2 and FIG. 3, a damper according to a first embodiment of the present invention includes a cylinder 110, a piston 120 coupled with the cylinder 110 to enable reciprocation motion and to generate a magnetic force by power impression, and a vibration-absorbing part 140 provided within the cylinder 110 to generate a frictional force by coming into contact with an inside surface of the cylinder 110 wherein the vibration-absorbing part 140 becomes attached to the piston 120 by the magnetic force to absorb vibration transferred to the cylinder 110 or the piston 120.

Preferably, the cylinder 110 has a cylindrical shape and the piston 120 has a rod shape. This is to prevent the damper 100 from being damaged because the piston 120 is rotated at a prescribed angle in a circumferential direction by vibration transferred from a vibrating body (e.g., washer).

Preferably, a magnetic force generating part 130 is provided to one end of the piston 120 to generate a magnetic force according to power impression. Of course, the magnetic force generating part 130 need not be necessarily provided to one end of the piston 120 unless failing to form a sufficient magnetic force at one end of the piston 120. Moreover, the magnetic force generating part 130 is screw-coupled with the end of the piston 120. Alternatively, the magnetic force generating part 130 can be built in one body of the end of the piston 120. In this case, the magnetic force of the magnetic force generating part 130 needs to be appropriately designed to fit a capacity of the vibrating body, e.g., a capacity of the washer.

The magnetic force generating part 130 includes a core 131 provided to one end of the piston 120 and a bobbin 132 provided to a circumference of the core 131. In this case, a coil is wound on the bobbin 132 to generate the magnetic force in case of power impression.

Optionally, the bobbin 132, which forms an exterior of the magnetic force generating part 130, can be loaded in the cylinder 110 to be exposed or not to be exposed. In case that the bobbin 132 is arranged to be exposed, an outside of the bobbin 132 and an inside of the cylinder 110 are preferably arranged to leave a predetermined gap G in-between. Hence, a friction between the bobbin 132 and the cylinder 110 can be prevented. Moreover, the bobbin 132 is electrically connected to a power supply (not shown in the drawing) via a lead 150.

The vibration-absorbing part 140 includes a frictional member 141 coming into contact with the inside of the cylinder 110 to generate a frictional force and a movable member 142 fixed to an inside of the frictional member 141 to be attracted by the magnetic force generated from the magnetic force generating part 130.

The frictional member 141 includes a multitude of friction rings each of which has a predetermined frictional force. The friction rings are provided to enclose an outer circumference of the movable member 142.

The frictional force of the vibration-absorbing part 140 substantially supports the tub 3 in FIG. 1 and absorbs the vibration transferred from the tub.

And, the movable member 142 can include a permanent magnet having a predetermined magnetic force. If one side of the piston 120 in the vicinity of the movable member 142 is arranged to have one pole (N or S), one side of the movable member 142 opposing the piston 120 is placed to have the other pole (S or N).

A guide 133 extends from the magnetic force generating part 130 in a length direction of the cylinder 110. The guide 133 is pressed to be fitted in the core 132 of the magnetic force generating part 130. Alternatively, the guide 133, as shown in FIG. 2, can be screw-coupled with the core 131 to be fixed thereto. Alternatively, the guide 133 can be built in one body of the core 131.

A stopper 134 is preferably provided to one end of the guide 133 to be prevented from escaping from the movable member 142. The stopper 134 approximately has a disc shape. Of course, the stopper 134 has any kind of shape that prevents the guide 133 from being separated from a sliding hole 142a of the movable member 142.

Preferably, the guide 133 is configured to have a circular cross-section. This is to prevent the piston 120 and the cylinder 110 from being damaged even if vibration occurs in a circumferential direction of the piston 120 or the cylinder 110. Alternatively, the guide 133 can be configured to have a shape of polygonal pillar.

Preferably, the guide 133 slides to be inserted in the vibration-absorbing part 140. For this, a sliding hole 142a is provided to the movable member 142 so that the guide 133 can slide to be fitted therein. Preferably, a steel member 143 formed of a steel based material is further provided to one side of the movable member 142 in the vicinity of the piston 120 so that an attractive force of the magnetic force generating part 130 can work thereon. Hence, the entire movable member needs not to be formed of the steel based material, whereby the damper can lose its weight more. It is a mater of course that the movable member 142 can be formed of the steel based material.

An operation of the above-configured damper according to the first embodiment of the present invention is explained as follows. In the following description, the cylinder is assembled to the tub of the drum type washer and the piston is joined to the base.

Prior to explaining the first embodiment of the present invention, a correlation between a rotational speed and an oscillation frequency of the drum is firstly explained in case that the damper is provided to the tub or in case that the damper is not provided to the tub.

Figure 4:
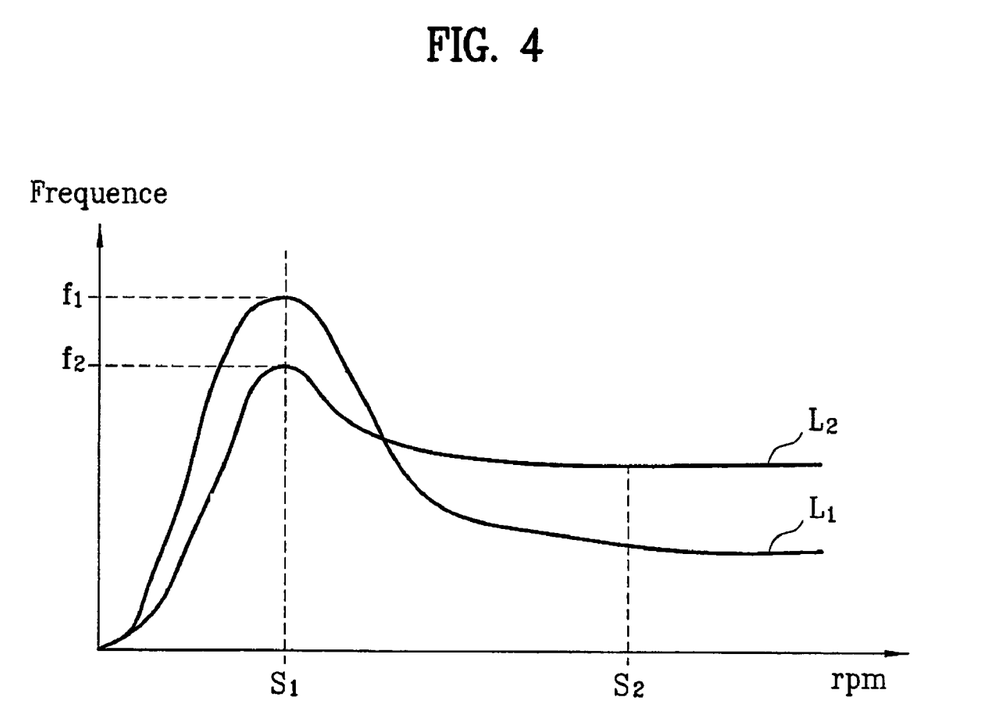
FIG. 4 is a graph of a vibration variation according to a dewatering cycle time of a washer in case that a damper is not provided.

First of all, if the damper 100 is not provided to the tub 3 in FIG. 1, an oscillation frequency has a curve L1 according to a rotational speed rpm of the drum 6. If the damper 100 is provided to the tub, the oscillation frequency has a curve L2 according to the rotational speed rpm of the drum 6. Namely, in case that the damper is provided to the tub, the damper reduces the vibration of the tub in an excessive vibration state S1 appearing in the early stage of the drum rotation. Yet, the oscillation frequency more considerably increases in a normal vibration state S2 than that of the case that the damper is not provided. In the normal vibration state, the damper even amplifies the vibration to result in such a phenomenon.

Therefore, in case that the damper is provided to the tub, a damper having a great damping power is advantageous in the excessive vibration sate S1 of the tub or a damper having a small damping power is advantageous in the normal vibration state S2 of the tub.

By such a principle, the present invention increases the damping power of the damper in the excessive vibration state or minimizes the damping power of the damper in the normal vibration state. Such an action is explained in detail in the following.

First of all, once a dewatering cycle is initiated, the driving device 4 in FIG. 1 rotates the drum 6 in FIG. 1. In doing so, by the rotational force of the drum 6 and the driving force of the driving device 4, a prescribed vibration is transferred to the tub.

Figure 5:
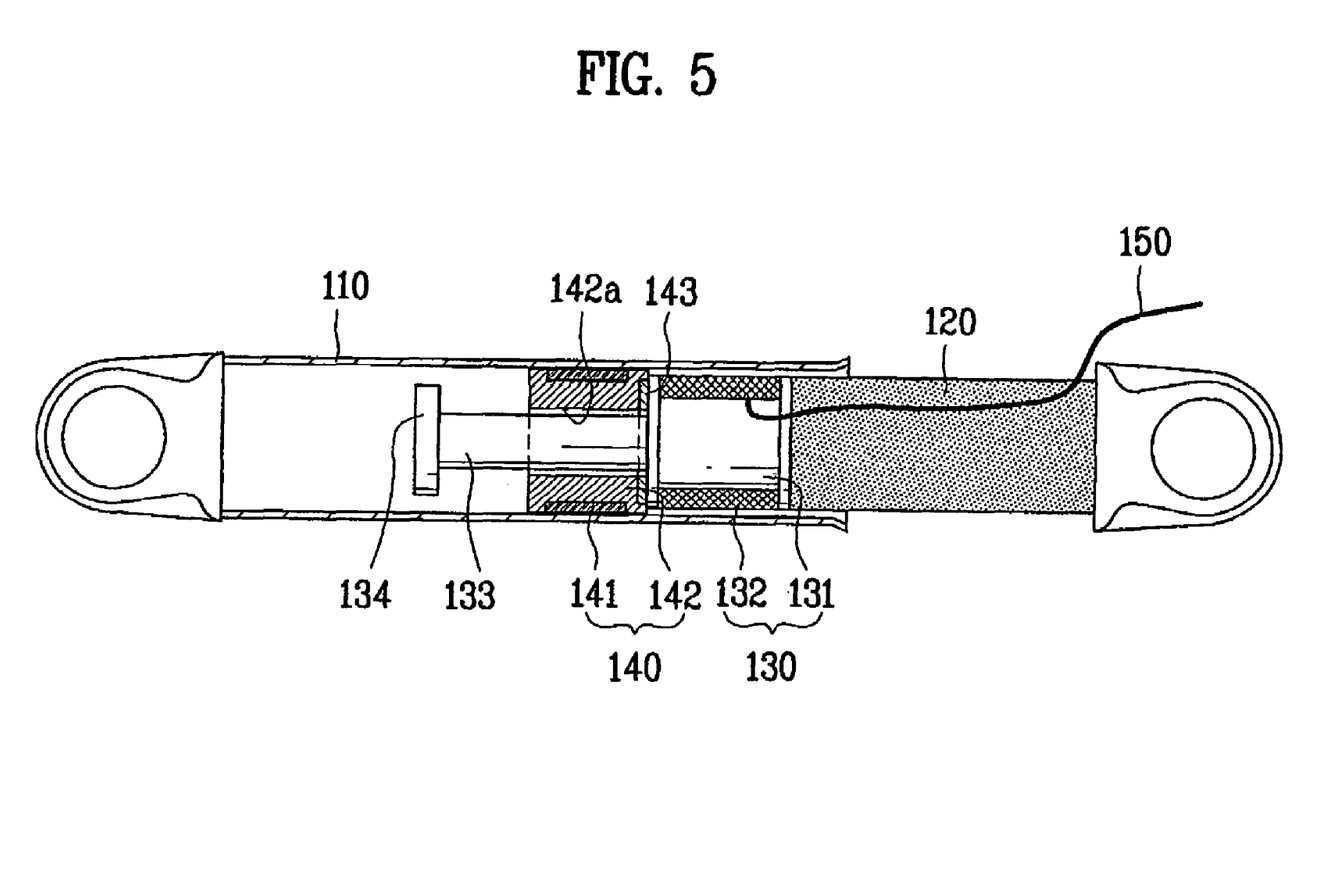
FIG. 5 is a cross-sectional diagram of a damper for explaining an action of the damper in case that a magnetic force is generated from a magnetic force generator in FIG. 2.

In doing so, if a control unit decides that the vibration of the tub exceeds a predetermined frequency, i.e., if the control unit decides that the vibration of the tub is in the excessive vibration state, power is supplied to the magnetic force generating part 130 to generate the magnetic force attributed to the reciprocal action between the bobbin 132 and the core 131. The magnetic force applies the attractive force to the steel member 143 fixed to the movable member 142 to attach the magnetic force generating part 130 and the vibration-absorbing part 140 together, which is shown in FIG. 5. Once the magnetic force generating part 130 and the vibration-absorbing part 140 are attached together, the vibration transferred to the cylinder 110 is transferred to the movable member 142 so that the frictional member 141 fixed to the movable member 142 comes into friction with an inner circumference of the cylinder 110. Such a frictional force enables the vibration-absorbing part 140 to absorb the vibration transferred from the tub.

As the dewatering cycle proceeds further, the oscillation frequency of the tub is gradually lowered.

If the control unit decides that the oscillation frequency of the vibration of the tub is below a predetermined frequency, i.e., if the control unit decides that the vibration of the tub reaches the normal vibration state, the power supplied to the magnetic force generating part 130 is cut off. Hence, the vibration-absorbing part 140 and the magnetic force generating part 130 are detached from each other as the magnetic force is released.

If so, the vibration of the tub is transferred to the cylinder 110 to vibrate the cylinder 110 in a direction of arrows shown in FIG. 3. In doing so, the movable member 142 is guided along the guide 143 extending from the core 141. And, the stopper prevents the guide from escaping from the movable member and is operative in restricting a width of the reciprocating motion of the cylinder 110.

Figure 6:
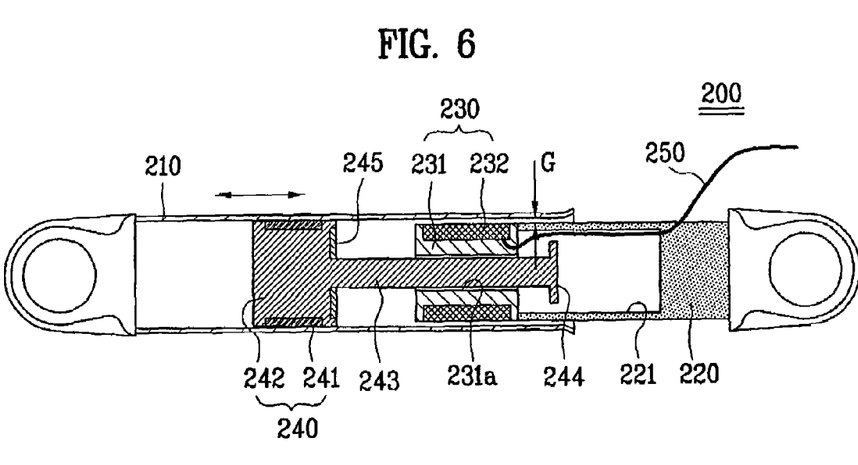
FIG. 6 is a cross-sectional diagram of a damper according to a second embodiment of the present invention.
Figure 7:
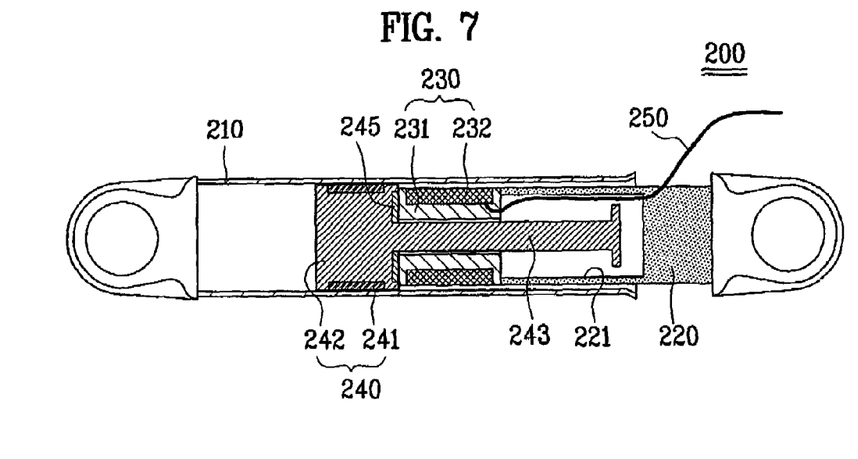
FIG. 7 is a cross-sectional diagram of a damper for explaining an action of the damper in case that a magnetic force is generated from a magnetic force generator in FIG. 6.

A damper according to a second embodiment of the present invention is explained as follows. As the elements of the second embodiment are similar to those of the first embodiment, specific parts of the second embodiment are explained in the following.

Referring to FIG. 7, a guide 243 extends from a vibration-absorbing part 240 in a length direction of a cylinder 210. The guide 243 is preferably inserted in the piston 220 to enable a reciprocating motion of the guide 243.

Specifically, the guide 243 extends from one side of a movable member 242 of the vibration-absorbing part 240 toward the piston 220. A sliding hole 231a is formed at a core 231 of a magnetic force generating part. And, a hollow portion 221 is formed within the piston 220 to communicate with the sliding hole 231a. In this case, the hollow portion 221 is formed long enough to receive the guide 243 therein in attaching the movable member 242 to a magnetic force generating part 230.

A bobbin 232 of the magnetic force generating part 230 can be provided to the cylinder 210 to be exposed or not to be exposed to the cylinder. In case that the bobbin 232 is exposed to the cylinder 210, an outer circumference of the magnetic force generating part 230 preferably leaves a predetermined gap from an inner circumference of the cylinder 210. Hence, it is able to prevent the bobbin 231 from coming into contact with the inner circumference of the cylinder 210, whereby the bobbin 231 is prevented from being damaged.

Preferably, a stopper 244 is provided to one end of the guide 243 to prevent the guide 243 from escaping from the sliding hole 231a. The stopper 244 has a disc shape having a diameter greater than that of the sliding hole 231a. Alternatively, a shape of the stopper 244 can be modified into any kind of shape that can prevent the escape of the guide 243. In this case, a diameter of the hollow portion 221 is formed greater than that of the stopper 244.

Preferably, the guide approximately has a circular cross-section. This is to prevent the guide 243 and the magnetic force generating part 230 from being damaged when the cylinder 210 is moved in a circumferential direction by the vibration. And, the guide 243 can be pressed to be fitted in the movable member 242. Alternatively, the guide 243 can be screw-coupled with the movable member 242.

A steel member 245 is provided to the movable member 242 to be attracted by the magnetic force generated from the magnetic force generating part 230. In this case, the steel member 245 is preferably provided to one side of the movable member 242 in the vicinity of the magnetic force generating part 230. Of course, the entire movable member can be formed of a steel based material.

And, the movable member 242 can include a permanent magnet having a predetermined magnetic force. If one side of the movable member 242 in the vicinity of the piston 220 is arranged to have one pole (N or S), the magnetic force generating part 240 has to have the other pole (S or N).

An operation of the above-configured damper according to the second embodiment of the present invention is explained as follows.

In the early stage of a dewatering cycle, if the control unit decides that the vibration of the tub is in the excessive vibration state, power is supplied to the magnetic force generating part 230 to generate the magnetic (attractive) force attributed to the reciprocal action between the bobbin 232 and the core 231. The magnetic force applies the attractive force to the steel member 245 fixed to the movable member 242 to attach the magnetic force generating part 230 and the vibration-absorbing part 240 together, which is shown in FIG. 7. In doing so, the guide 243 is most deeply inserted in the hollow portion 221. And, the sliding hole 231a of the magnetic force generating part 230 is operative in supporting the guide 243.

Once the magnetic force generating part 230 and the vibration-absorbing part 240 are attached together, the vibration transferred to the cylinder 210 is absorbed by the friction between the frictional member 241 and the cylinder 210.

Subsequently, if the control unit decides that the vibration of the tub reaches the normal vibration state, the power supplied to the magnetic force generating part 230 is cut off. Hence, the vibration-absorbing part 240 and the magnetic force generating part 230 are detached from each other as the magnetic force is released.

If so, the vibration of the tub is transferred to the cylinder 210 to vibrate the cylinder 110 in a direction of arrows shown in FIG. 6. In doing so, the piston 220 is guided along the guide 243 extending from the vibration-absorbing part 240. And, the stopper 244 prevents the guide 243 from escaping from the core 231 of the magnetic force generating part 230 and is operative in restricting a width of the reciprocating motion of the cylinder 210.

Figure 8:
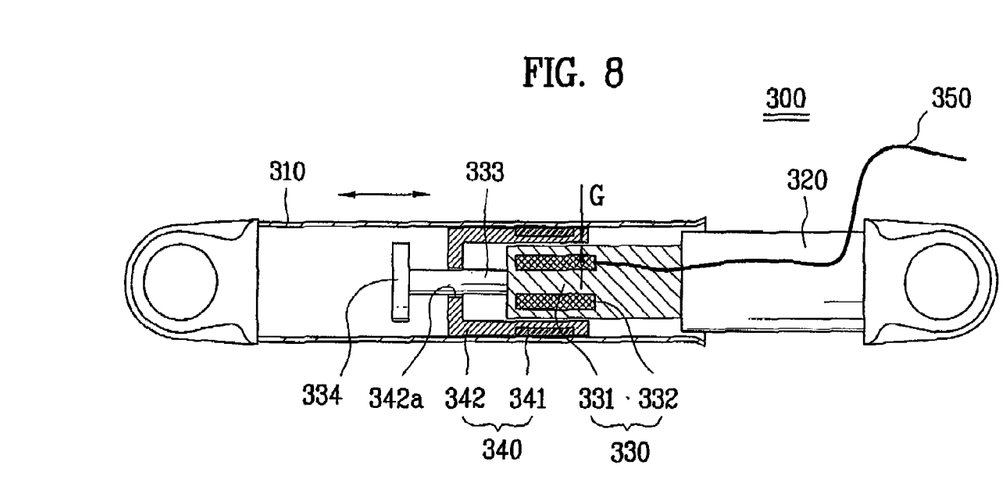
FIG. 8 is a cross-sectional diagram of a damper according to a third embodiment of the present invention.
Figure 9:
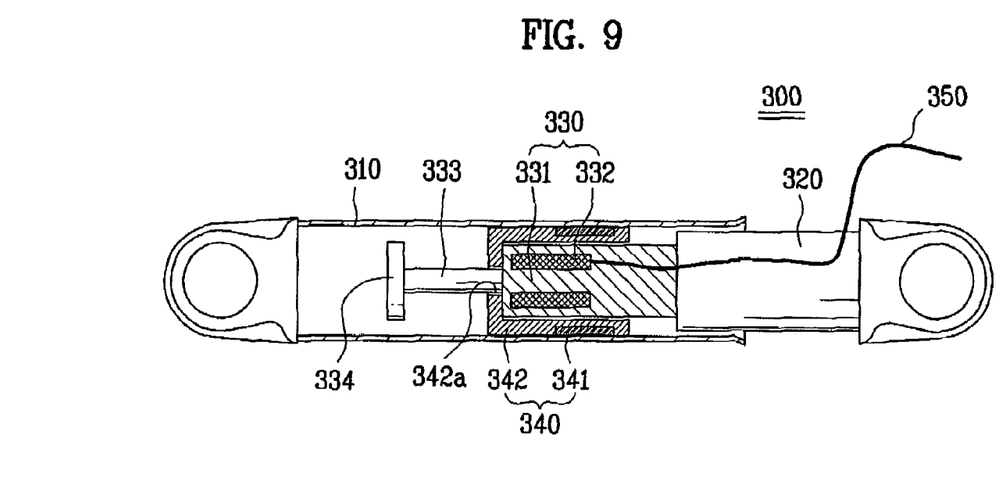
FIG. 9 is a cross-sectional diagram of a damper for explaining an action of the damper in case that a magnetic force is generated from a magnetic force generator in FIG. 8.

A damper according to a third embodiment of the present invention is explained as follows. As the elements of the third embodiment are similar to those of the first embodiment, specific parts of the third embodiment are explained in the following.

FIG. 8 is a cross-sectional diagram of a damper according to a third embodiment of the present invention, and FIG. 9 is a cross-sectional diagram of a damper for explaining an action of the damper in case that a magnetic force is generated from a magnetic force generator in FIG. 8.

Referring to FIG. 9, a magnetic force generating part 330 is inserted in a vibration-absorbing part 340 enable its reciprocating motion.

A guide 333 extends from a core 331 of the magnetic force generating part 330 in a length direction of a cylinder 310. The guide 333 is pressed to be inserted in the core 331. Alternatively, the guide 333 is screw-coupled with or built in one body of the core 331.

A bobbin 332 is provided to enclose the core 331. Preferably, the bobbin 332, as shown in FIG. 8, is provided not to be exposed to the cylinder. Of course, the bobbin 332 can be provided to be exposed to the cylinder 310. And, an outer circumference of the magnetic force generating part 330 is preferably provided to leave a predetermined gap G from an inner circumference of the vibration-absorbing part 340.

The guide 333 is inserted in a movable member 342 to enable its sliding motion. Preferably, a stopper 334 is provided to one end of the guide 333 to prevent the guide 333 from escaping from the movable member 342. Preferably, the guide 334 approximately has a circular cross-section. Alternatively, a shape of the guide 334 can be variously modified.

The vibration-absorbing part 340 includes a movable member 342 in which the magnetic force generating part 330 is inserted to enable its reciprocating motion and a frictional member 341 provided to an outer circumference of the movable member 342 to come into friction with an inner circumference of the cylinder 310.

Preferably, a hollow portion 345 is formed within the movable member 342 so that the magnetic force generating part 330 is inserted therein. And, a sliding hole 342a is formed at one end of the movable member 342 opposite to the magnetic force generating part 330 so that the guide 333 slides to be fitted therein. The sliding hole 342a guides the reciprocating motion of the cylinder 310 stably.

The movable member 342 is preferably formed of a steel based material to be attracted by the magnetic force generating part 330 in case that a magnetic force is generated from the part 330. Optionally, a steel member can be provided to a prescribed portion of the movable member 342.

And, the movable member 342 can include a permanent magnet having a predetermined magnetic force. If one side of the movable member 342 in the vicinity of the piston 320 is arranged to have one pole (N or S), the magnetic force generating part 330 has to have the other pole (S or N).

An operation of the above-configured damper according to the third embodiment of the present invention is explained as follows.

In the early stage of a dewatering cycle, if the control unit decides that the vibration of the tub is in the excessive vibration state, power is supplied to the magnetic force generating part 330 to generate the magnetic (attractive) force attributed to the reciprocal action between the bobbin 332 and the core 331. The magnetic force applies the attractive force to the movable member 342 to attach the magnetic force generating part 330 and the vibration-absorbing part 340 together, which is shown in FIG. 9. In doing so, the magnetic force generating part 330 is inserted inside the movable member 342 to considerably increase the contact area between the magnetic force generating part 330 and the vibration-absorbing part 340, whereby the adhesion considerably increases higher than that of the first or second embodiment. Once the magnetic force generating part 330 and the vibration-absorbing part 340 are attached together, the vibration is absorbed by the friction between the inner circumference of the cylinder 310 and the frictional member 341.

Subsequently, if the control unit decides that the vibration of the tub reaches the normal vibration state, the vibration of the tub is transferred to the cylinder 310 to vibrate the cylinder 310 in a direction of arrows shown in FIG. 8. In doing so, the movable member 342 is guided along the guide 333 extending from the core 331. And, the stopper 334 prevents the guide 333 from escaping from the movable member 341 and is operative in restricting a width of the reciprocating motion of the cylinder 310.

Figure 10:
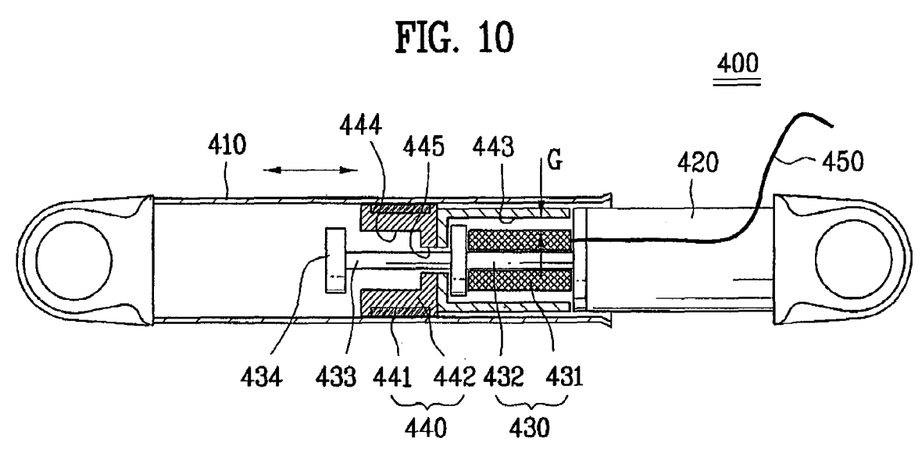
FIG. 10 is a cross-sectional diagram of a damper according to a fourth embodiment of the present invention.

A damper according to a fourth embodiment of the present invention is explained as follows.

FIG. 10 is a cross-sectional diagram of a damper according to a fourth embodiment of the present invention.

As the elements of the fourth embodiment are similar to those of the first embodiment, specific parts of the third embodiment are explained in the following.

Referring to FIG. 10, a guide 433 extends from a magnetic force generating part 430 in a length direction of a cylinder 410. The guide 433 slides in a vibration-absorbing part 440 to be fitted therein. A first hollow portion 443 is provided to the vibration-absorbing part 430 so that the magnetic force generating part 430 can slide to be fitted therein. And, a second hollow portion 444 is provided to the vibration-absorbing part 440 to receive the guide 433 therein.

A sliding hole 445 is formed at an approximate length-directional center of the movable member 442 so that the guide 433 slides to be fitted therein. The magnetic force generating part 430 is loaded in the first hollow portion 443 situated at the movable member 442 in the vicinity of the magnetic force generating part 430 to enable its reciprocating motion. And, the guide 433 is received in the second hollow portion 444 of the movable member 442 opposite to the magnetic force generating part 430 to enable its reciprocating motion.

In this case, an inner circumference of the movable member 442 and an outer circumference of the magnetic force generating part 430 are preferably installed to leave a predetermined gap G in-between.

Preferably, a stopper 434 is provided to one end of the guide 433 to prevent the guide from escaping from the movable member 442.

Preferably, the guide 433 is configured to have a circular cross-section.

In this case, a frictional member 441 is arranged to confront the second hollow portion 444 of the movable member 442.

And, the movable member 442 can include a permanent magnet having a predetermined magnetic force. If one side of the movable member in the vicinity of the piston is arranged to have one pole (N or S), the magnetic force generating part has to have the other pole (S or N).

The above-configured damper according to the fourth embodiment of the present invention almost has the same operation of the third embodiment of the present invention, which is skipped in the following description.

Figure 11:
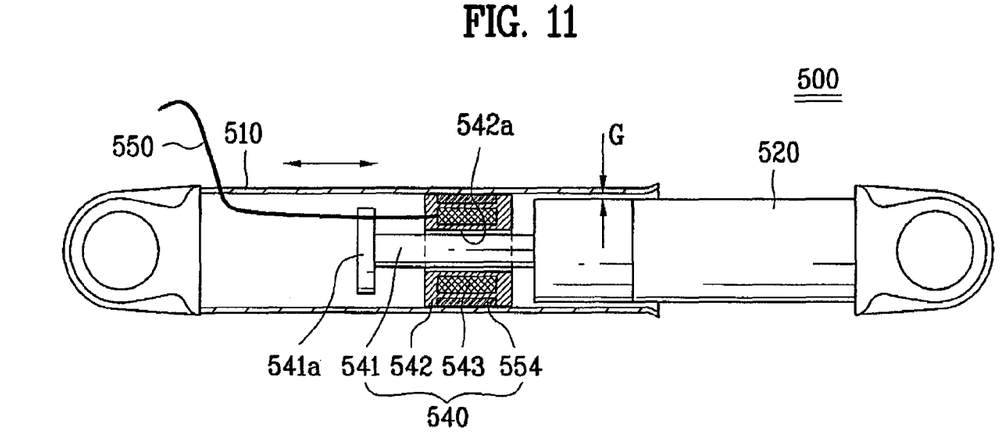
FIG. 11 is a cross-sectional diagram of a damper according to a fifth embodiment of the present invention.

A damper according to a fifth embodiment of the present invention is explained as follows.

FIG. 11 is a cross-sectional diagram of a damper according to a fifth embodiment of the present invention.

Referring to FIG. 11, a damper 500 according to a fifth embodiment of the present invention includes a cylinder 510, a piston 520 coupled with the cylinder 510 to enable its reciprocation motion, and a vibration-absorbing part 540 provided within the cylinder 510 to generate a frictional force by coming into contact with an inside surface of the cylinder 510 and to generate a magnetic force by power impression wherein the vibration-absorbing part 540 becomes attached to the piston 520 by the magnetic force to absorb vibration transferred to the cylinder 510 or the piston 520.

Preferably, the cylinder 510 has a cylindrical shape and the piston 520 has a rod shape. This is to prevent the damper 500 from being damaged because the piston 520 is rotated at a prescribed angle in a circumferential direction by vibration transferred from a vibrating body. Preferably, a predetermined gap G is provided between an inner circumference of the cylinder 510 and an outer circumference of the piston 520.

The vibration-absorbing part 540 is provided within the cylinder 510. The vibration-absorbing part 540, to which power is applied, generates a magnetic force to be attached to the piston 520. And, the vibration-absorbing part 540 is attached to the cylinder 510 to absorb vibration transferred from the tub. In this case, the vibration-absorbing part 540 is substantially configured with a portion absorbing the vibration and a portion generating the magnetic force. And, such a configuration is explained in detail as follows.

The vibration-absorbing part 540 includes a core 541 extending from one end of the piston 520 in a length direction of the cylinder 510, a movable member 542 provided within the cylinder so that the core can slide to be fitted therein, a bobbin 543 having a coil wound on the movable member 542 to enclosing the core 541, and a frictional member 544 enclosing an outer circumference of the movable member 542 to generate a frictional force by coming into contact with an inner circumference of the cylinder 510.

The core 541 extends from one end of the piston 520 in a length direction of the cylinder 510. The core 541 substantially performs the guide function of the aforesaid embodiments and substantially plays a role as the core 541. Hence, the core 541 preferably has a circular rod shape. This is to prevent the vibration-absorbing part 540 and the guide 541 from being damaged by the vibration component transferred to the cylinder 510 in the circumferential direction.

An inner circumference of the bobbin 543 and an outer circumference of the core 541 are preferably separated to leave a predetermined gap in-between. And, the bobbin 543 can be provided within the movable member 542. Alternatively, the bobbin 543 can be provided to form an inner circumference of the movable member 542. Preferably, the bobbin 543 is provided within the movable member 542 to prevent the damage caused to the bobbin. And, the bobbin 543 is electrically connected to a power supply via a lead 550.

Protrusions can be inwardly provided to both ends of the sliding hole 542a to prevent the core 541 from coming into contact with both ends of the bobbin 543, respectively.

A stopper 541a is preferably provided to one end of the core 541 to prevent the core 541 from escaping from the movable member 542.

The core 541 is configured to have a circular cross-section. This is to receive the vibration in the circumferential direction.

Meanwhile, one end of the piston 520 can be configured with a permanent magnet having a pole (N or S). If so, one side of the vibration-absorbing part 540 in a piston side is configured to have an opposite pole (S or N).

An operation of the above-configured damper according to the fifth embodiment of the present invention is explained as follows.

First of all, after a dewatering cycle is initiated, if a control unit decides that the vibration of the tub exceeds a predetermined frequency, i.e., if the control unit decides that the vibration of the tub is in the excessive vibration state, power is supplied to the vibration-absorbing part 540 to generate the magnetic force attributed to the mutual action between the bobbin 543 and the core 5441. The magnetic force applies the attractive force to one end of the piston 520 to attach the piston 520 and the vibration-absorbing part 543 together. Once one end of the piston 520 and the vibration-absorbing part 540 are attached together, the vibration transferred to the cylinder 510 is transferred to the vibration-absorbing part 540 so that the frictional member 544 fixed to the vibration-absorbing part 540 comes into friction with an inner circumference of the cylinder 510. Such a frictional force enables the vibration-absorbing part 540 to absorb the vibration transferred from the tub.

As the dewatering cycle proceeds further, the oscillation frequency of the tub is gradually lowered.

If the control unit decides that the oscillation frequency of the vibration of the tub is below a predetermined frequency, i.e., if the control unit decides that the vibration of the tub reaches the normal vibration state, the power supplied to the vibration-absorbing 540 is cut off. Hence, the vibration-absorbing part 540 and the piston 520 are detached from each other as the magnetic force is released.

If so, the vibration of the tub is transferred to the cylinder 510 to vibrate the cylinder 510 in a direction of arrows shown in FIG. 11. In doing so, the vibration-absorbing part 540 is guided along the core 541 extending from the piston 540. And, the stopper 541a prevents the core 541 from escaping from the vibration-absorbing part 540 and is operative in restricting a width of the reciprocating motion of the cylinder 510.

Meanwhile, a method of controlling the damper according to first to fifth embodiments of the present invention is explained as follows.

First of all, the control unit decides the oscillation frequency of the vibrating body in driving the vibrating body. If the vibrating body vibrates at a frequency exceeding a predefined oscillation frequency, power is applied to the magnetic force generating part to generate a magnetic force. The magnetic force attaches the piston and the vibration-absorbing part together to absorb the vibration transferred to the cylinder and piston. If the vibrating body vibrates at a frequency below a predefined oscillation frequency, the power applied to the magnetic force generating part is cut off to cancel the magnetic force.

One exemplary application of the damper to the vibrating body is explained as follows.

First of all, in the early stage of the dewatering cycle of the washer, if the tub vibrates at a predetermined oscillation frequency before the tub reaches a peak S1 in FIG. 4 in the excessive vibration state, power is applied to the magnetic force generating part. Hence, shaking of the tub is minimized to reduce the vibration. Simultaneously, the vibration transferred from the tub can be used for the frictional force of the frictional member. Therefore, the noise caused by the vibration in the early state of the dewatering cycle can be reduced.

Subsequently, if the tub lies in the normal vibration state S2 in FIG. 4, the power applied to the magnetic force generating part is cut off. Hence, it is able to prevent the vibration of the tub from being amplified by the damper in the normal vibration state.

Meanwhile, the control of the damper is described for the dewatering cycle only. But, the control of the damper is also applicable to a washing or rinsing cycle for controlling the damper according to the oscillation frequency of the tub.

Accordingly, the present invention provides the following effects or advantages.

First of all, the damper is configured to have optimal damping performance according to the oscillation frequency of the tub, whereby the vibration amplification triggered by the damper is prevented and whereby the noise attributed to the vibration is reduced.

Secondly, the damping performance is adjusted to fit the excessive vibration state in the early stage of the dewatering cycle or the normal vibration state thereafter, whereby the noise of the washer can be reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A damper comprising:
    a cylinder;
    a piston coupled with the cylinder to enable a reciprocating motion, and comprising a magnetic force generating part which generates a magnetic force; and
    a vibration-absorbing part provided within the cylinder, the vibration-absorbing part generating a frictional force by coming into contact with an inner circumference of the cylinder,
    wherein the vibration-absorbing part attaches to the piston to absorb a vibration transferred to the cylinder or the piston when the magnetic force generating part generates the magnetic force.

2. The damper of claim 1, wherein the magnetic force generating part is provided at one end of the piston.

3. The damper of claim 2, wherein the magnetic force generating part comprises:
    a core provided at the one end of the piston; and
    a bobbin provided outside the core,
    wherein a coil is wound on the bobbin to generate the magnetic force.

4. The damper of claim 1, wherein the vibration-absorbing part comprises:
    a frictional member that contacts an inside of the cylinder to generate a frictional force; and a movable member fixed to an inside of the frictional member that attaches to the piston when the magnetic force generating part generates the magnetic force.

5. The damper of claim 1, wherein a guide extends from the magnetic force generating part along a length direction of the cylinder and wherein the guide slides to be inserted in the vibration-absorbing part.

6. The damper of claim 1, wherein a guide extends from the vibration-absorbing part along a length direction of the cylinder and wherein the guide slides to be inserted in the piston.

7. The damper of claim 1, wherein the magnetic force generating part is provided within the vibration-absorbing part and moves in a reciprocating motion.

8. The damper of claim 7, wherein the magnetic force generating part is provided within a hollow portion of the vibration-absorbing part.

9. The damper of claim 7, wherein a guide extends from the magnetic force generating part along a length direction of the cylinder and slides within a first hollow portion of the vibration-absorbing part, and the magnetic force generating part moves in a reciprocating motion within a second hollow portion of the vibration-absorbing part.

10. A damper comprising:
a cylinder;
a piston coupled with the cylinder to enable a reciprocating motion; and
a vibration-absorbing part provided within the cylinder, the vibration-absorbing part generating a frictional force by coming into contact with an inner circumference of the cylinder, and attaching to the piston to absorb a vibration transferred to the cylinder or the piston by generating a magnetic force.

11. The damper of claim 10, wherein the vibration-absorbing part comprises:
a core extending from one end of the piston in a length direction of the cylinder;
a movable member provided within the cylinder, the core sliding within the movable member;
a bobbin provided outside the movable member, the bobbin having a coil wound thereon to enclose the core; and
a frictional member enclosing an outer circumference of the movable member, the frictional member coming into contact with the inner circumference of the cylinder to generate the frictional force.

12. The damper of claim 11, wherein a guide extends from one end of the piston in a length direction of the cylinder and wherein the guide slides to be inserted in the vibration-absorbing part.

13. A washer comprising:
a tub;
a drum rotatably provided within the tub;
a cylinder supported by either a base or the tub;
a piston supported by either the tub or the base, the piston coupled with the cylinder to enable a relative reciprocating motion, and comprising a magnetic force generating part which generates a magnetic force; and
a vibration-absorbing part provided within the cylinder, the vibration-absorbing part generating a frictional force by coming into contact with an inner circumference of the cylinder,
wherein the vibration-absorbing part attaches to the piston to absorb a vibration transferred to the cylinder or the piston when the magnetic force generating part generates the magnetic force.

14. The washer of claim 13, wherein the magnetic force generating part is provided at one end of the piston.

15. The washer of claim 14, wherein the magnetic force generating part comprises:
a core provided at the one end of the piston; and
a bobbin provided outside the core,
wherein a coil is wound on the bobbin to generate the magnetic force.

16. The washer of claim 13, wherein the vibration-absorbing part comprises:
a frictional member that contacts an inside of the cylinder to generate a frictional force; and
a movable member fixed to an inside of the frictional member that attaches to the piston when the magnetic force generating part generates the magnetic force.

17. A washer comprising:
a tub;
a drum rotatably provided within the tub;
a cylinder and a piston supported by a base and the tub, the cylinder and the piston assembled together to enable relative reciprocating motion; and
a vibration-absorbing part provided within the cylinder, the vibration-absorbing part attaching to the piston to absorb a vibration transferred to the cylinder or the piston by generating a magnetic force.

18. The washer of claim 17, wherein the vibration-absorbing part comprises:
a core extending from one end of the piston in a length direction of the cylinder;
a movable member provided within the cylinder, the core sliding within the movable member;
a bobbin provided outside the movable member, the bobbin having a coil wound thereon to enclose the core; and
a frictional member enclosing an outer circumference of the movable member, the frictional member coming into contact with the inner circumference of the cylinder to generate the frictional force.

* * * * *

UNITED STATES PATENT AND TRADEMARK OFFICE
CERTIFICATE OF CORRECTION

| | | |
|---|---|---|
| PATENT NO. | : 7,412,852 B2 | Page 1 of 1 |
| APPLICATION NO. | : 11/062821 | |
| DATED | : August 19, 2008 | |
| INVENTOR(S) | : G. R. Park et al. | |

It is certified that error appears in the above-identified patent and that said Letters Patent is hereby corrected as shown below:

Title Page

On the cover of the printed patent, at Item (54), Title, after "Washer" insert -- , --.

Signed and Sealed this

Third Day of March, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,412,852 B2 |
| APPLICATION NO. | : 11/062821 |
| DATED | : August 19, 2008 |
| INVENTOR(S) | : G. R. Park et al. |

It is certified that error appears in the above-identified patent and that said Letters Patent is hereby corrected as shown below:

Title Page

On the cover of the printed patent, at Item (54) and Column 1, line 1, Title, after "Washer" insert -- , --.

This certificate supersedes the Certificate of Correction issued March 3, 2009.

Signed and Sealed this

Thirty-first Day of March, 2009

JOHN DOLL
*Acting Director of the United States Patent and Trademark Office*